United States Patent [19]
Beson

[11] Patent Number: 5,445,359
[45] Date of Patent: Aug. 29, 1995

[54] GATE VALVE

[76] Inventor: John Beson, 10938 Leaning Ash, Houston, Tex. 77079

[21] Appl. No.: 176,741

[22] Filed: Jan. 3, 1994

Related U.S. Application Data

[63] Continuation of Ser. No. 758,018, Sep. 12, 1991, abandoned, which is a continuation-in-part of Ser. No. 504,512, Apr. 4, 1990, abandoned, which is a continuation-in-part of Ser. No. 493,045, Mar. 12, 1990, abandoned, which is a continuation of Ser. No. 343,474, Apr. 26, 1989, abandoned, which is a continuation of Ser. No. 189,574, May 3, 1988, abandoned, which is a continuation of Ser. No. 49,231, May 13, 1987, abandoned, which is a continuation of Ser. No. 659,614, Oct. 11, 1984, abandoned, which is a continuation-in-part of Ser. No. 551,589, Nov. 14, 1983, Pat. No. 4,566,671.

[51] Int. Cl.[6] .............................. F16K 25/00
[52] U.S. Cl. .................................. 251/159; 251/167; 251/172; 251/174; 251/203
[58] Field of Search ............... 251/159, 170, 172, 174, 251/203

[56] References Cited

U.S. PATENT DOCUMENTS 4,280,522  6/1981  Peshnyo ........................ 137/174

*Primary Examiner*—Martin P. Schwadron
*Attorney, Agent, or Firm*—David M. Ostfeld

[57] ABSTRACT

A gate valve [10] is disclosed having a primary [300, 302] and secondary [316] seal on the upstream and downstream sides of the gate [15], wherein the gate [15] forms a seal with the seat [300] which is activated mechanically [320] and is fluid powered, and wherein a resilient seal [316a] is moved toward the gate [15] by mechanical actuation [31 ] to form a fluid powered secondary fluid-tight seal with the gate [15].

27 Claims, 11 Drawing Sheets

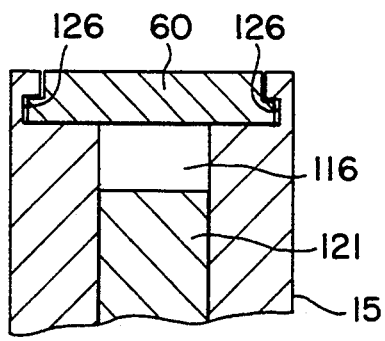
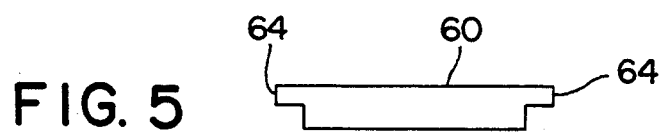
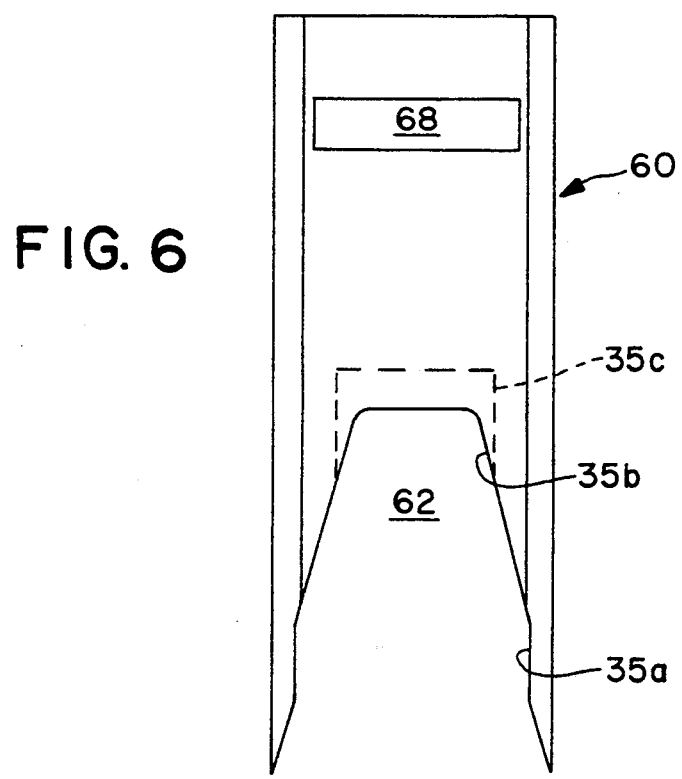
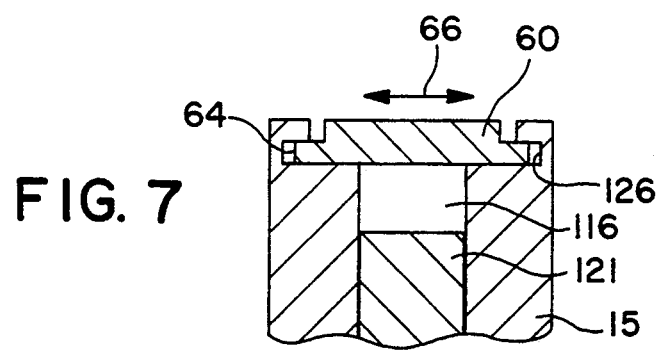

GATE VALVE

CROSS REFERENCE TO RELATED APPLICATIONS

This is a continuation of application Ser. No. 758,018, filed Sep. 12, 1991, now abandoned, which is a continuation in part of U.S. patent application Ser. No. 504,512, filed Apr. 4, 1990, now abandoned, which is a continuation in part of U.S. patent application Ser. No. 493,045, filed Mar. 12, 1990, now abandoned, which is a continuation of application Ser. No. 343,474, filed Apr. 26, 1989, now abandoned, which is a continuation of application Ser. No. 189,574, filed May 3, 1988, now abandoned, which is a continuation of application Ser. No. 049,231, filed May 13, 1987, now abandoned, which is a continuation of application Ser. No. 659,614, filed Oct. 11, 1984, now abandoned, which is a continuation in part of application Ser. No. 551,589, filed Nov. 14, 1983, by John Beson, entitled "Gate Valve Having An Improved Secondary Seal," now U.S. Pat. No. 4,566,671.

TECHNICAL FIELD

The present invention relates to the gate valves and, more specifically, it relates to gate valves having a secondary seal.

BACKGROUND OF THE INVENTION

Gate valves have been commonly used for many years and have been employed in a variety of services such as in the oil and/or gas services of the petroleum industry. However, such valves have been designed for service involving pressures of only several thousand pounds per square inch. Today it is necessary to have block and bleed valves at such a pressure range. Also, today due to the depleted energy supply it has become necessary to explore and produce oil and gas under very high pressures of the range 30,000 psi (pounds per square inch) or more. Such high pressures have required greater sealing capacity and better safety features in such valves.

Prior art gate valves generally consist of a valve body having inlet and outlet conduits with a chamber therebetween. A gate having an opening therethrough is disposed in a valve seat mounted within the chamber and the gate is mounted on a stem. The chamber is closed by a bonnet affixed to the valve housing. The stem reciprocates within the bonnet and is attached to a reciprocating apparatus for moving the gate between a closed position in which flow is blocked through the conduits and the gate opening. Such a valve is illustrated in U.S. Pat. Nos. 3,538,938 and 3,696,831.

It is also well known to seal between the valve seat and the valve housing by using an O-ring as shown in U.S. Pat. Nos. 2,957,492 and 3,348,567 and non extrusion seals as shown in U.S. Pat. No. 4,264,054. Further in automatic pressure sealed gate valves shown in U.S. Pat. Nos. 3,095,604; 3,538,938; and 3,696,831, fluent sealant rings are disposed around the valve seats to provide sealing between the valve housing and valve seats in response to line pressure on fluent sealant reservoirs in communication with the fluent sealant rings, and O-rings are installed on each side of the sealant rings to isolate the fluent sealant in the fluent sealant rings from contamination by line fluids. This same principle is used for seals in wellheads as shown in U.S. Pat. No. 2,952,479. It is also known to locate an O-ring seal on the end of the gate seat as shown in U.S. Pat. No. 3,696,831. U.S. Pat. Nos. 3,057,630 and 3,758,072 teach combining an elastomeric O-ring and a polyflouroethylene polymer such as the brand "Teflon" or "nylon" or other low-friction plastic ring to make a seal ring. Further, U.S. Pat. No. 3,103,366 teaches a deformable metal ring, as for example of aluminum, with an inner deformable plastic ring of polytetrafluoroethylene whereby the metal ring can adapt itself to slightly varying recess clearances and prevent the plastic ring from extruding through the clearances under pressure.

Two piece seats are also known in the art for floating seats as shown by brochures of Model 20 gate valves of FMC, and for replaceable seals through non metallic inserts to seats of Seaboard as shown by its brochure and U.S. Pat. Nos. 4,376,526 and 4,124,194. Another replaceable seal in seats is shown by U.S. Pat. No. 4,163,544. A floating seat with a replaceable seal support element is shown by U.S. Pat. No. 3,273,855.

Secondary seals where the gate forms a metal-to-metal seal with the seat and where a resilient seal is moved toward the gate when the gate is in the closed position to form a secondary fluid-tight seal with the gate is shown by U.S. Pat. No. 4,377,273. Manual operations for removal of flow blocking plates and primary seal actuation after such removal are shown in U.S. Pat. No. 2,203,989. Sliding seals are shown in U.S. Pat. No. 2,471,941. Other valve seals are shown by U.S. Pat. Nos. 3,472,270, 2,134,277, 2,776,813, 1,692,496, and 3,557,822.

As discussed in U.S. Pat. No. 4,377,273, one problem frequently encountered in the case of gate valves is the lack of formation of adequate seals between the gate or gates and the seat or seats. In turn, if a seal is inadequate, the gate valves are often prone to leak through the seal. In U.S. Pat. No. 4,377,273, an invention is disclosed which seeks to provide an adequate seal for gate valves in the form of a positive bidirectional cam actuated and deactuated resilient secondary fluid seal.

While the invention described in U.S. Pat. No. 4,377,273 is believed to be advantageous for many applications, it has been found that there are applications in which other secondary seals may be provided. For example, in high pressure situations wherein the formation of the secondary seal causes a significant pressure differential on the two sides of the gate and/or wherein the secondary seal is located on the downstream side, it has been found that for some applications, the drag on the secondary seal caused by movement of the gate to open when the secondary seal is fully effected may exaggerate the wear of the secondary seal. The additional drag on the gate also increases the effort required to open the valve. It is desirable in those instances to be able to deenergize or release the secondary seal prior to substantial linear movement of the gate across the seal.

In this regard, it is not necessary to totally withdraw the seal from the gate, but rather it is desirable to relieve the full pressure of the seal against the gate, or "deenergize" the seal, such that the pressure of the fluid moving through the valve will flow between the seal and the gate to preclude wear.

Additionally, in some high pressure situations wherein the secondary seal is fully effected or energized with no pressure in the valve body, and pressure is thereafter applied from the upstream side, there is no way for the fluid to enter into the body without leaking past the energized upstream secondary seal. Since the upstream secondary seal is mechanically energized, it is maintained until the pressure load of the fluid overcomes the mechanical load. In some instances, the pressure of the fluid is great enough to blow past the seal once it overcomes the mechanical energy of the seal, thereby damaging the resilient sealing ring contained in the seal.

It is also desirable to have an inexpensive block and bleed valve. In pipeline service and in some industrial applications there is a requirement to be able to open the valve body to atmosphere to determine if the upstream seat-to-gate or secondary seal to gate seal is sealing. This method of determining if the valve is sealing while in the line and under pressure is known in the industry as "block and bleed".

It is further therefore desirable to provide a pressure relief means from a secondary seal subjected to such pressurized fluid under the above conditions, in which the fluid will force the seal away from the gate and allow movement of the fluid past the seal without damaging the resilient seal element when the pressure of the fluid reaches a selected value.

It is also desirable to provide for primary and secondary seals upstream and downstream so that the gate seals on the upstream side may perform a block and bleed test.

Also, seats that are press fitted into the valve body are difficult to replace, particularly in the field. Special tools are required to overcome the press fit and the valve body counterbore is subject to damage by gaulling between the seat outer diameter and valve body counterbore during installation and removal of the seat. It is desirable to provide a seat that can be replaced easily without disturbing the press fit between the seat and the body.

SUMMARY OF THE INVENTION

The present invention provides a means for providing a block and bleed feature by providing upstream and downstream primary and secondary seals that activate mechanically through the inclusion of spring members and maintain on pressure application.

The present invention also provides a means for providing pressure relief through the inclusion of a spring member in conjunction with the resilient secondary seal. The spring member has a selected spring constant chosen such that the spring will yield to allow fluid past the secondary seal when the pressure is sufficient to exert a selected force upon the seal ring.

The means for deenergizing the secondary seal prior to substantial linear movement of the gate may be effected in several ways. In one, the seal may be quickly deenergized through the provision of an elastomeric seal ring disposed between the seal support ring and the resilient seal member such that movement of the seal support ring causes immediate lessening of the pressure on the secondary seal and the loss of the seal on the secondary seal because of the expansion and elasticity provided by the compressed elastomeric seal member. In another approach, the seal may be deenergized through means of a floating wedge slidably mounted to the gate such that the wedge is adapted for movement to release the seal prior to movement of the gate. Each of these designs, therefore, effectively takes pressure off the resilient seal member of the secondary seal before substantial movement, or in the case of the wedge, before any movement of the gate across secondary seal.

The means for providing a seat that is easily replaced without disturbing the original press fit between the seat outer diameter and the valve body is effected by providing a three piece split seat consisting of a seat body member press fit to the valve body, a seat face member which is threaded onto the seat body member, and a resilient seal ring sealing between the seat body member and seat face member. Should any damage occur to the seat face, which is not uncommon in oilfield installations, the seat face member can easily be replaced by screwing it off from the seat body member and a new one screwed on. In this manner, the press fit of the seat body member with the valve body is not disturbed. A new seal ring between the seat body member and the seat face ring can also be installed when replacing the seat face ring.

More specifically, the present invention includes a gate valve comprising a valve body having a valve chamber therewithin and a pair of flow passages through the valve body aligned at opposite sides of the valve chamber. The valve body further has a recess around the inner end of each of the aligned flow passages with a seat member disposed therein. A ring-shaped seat member is disposed in each recess around the inner end of the flow passages and a secondary seat member is slidably disposed around at least one of the ring-shaped seat members. In one embodiment, the secondary seal member comprises a ring-shaped support element including portions extending along opposite sides of the gate. A seal means is supported by the ring-shaped support element facing the gate. The gate valve further includes cooperating cam means associated with the gate and with the ring-shaped support element for moving the ring-shaped support element toward the gate when the gate is moved toward the closed position to form a secondary seal between the secondary seal member and the gate, and for certain embodiments deenergizing the secondary seal prior to substantial movement of the gate toward an open position.

In an embodiment of the present invention, the cooperating cam means includes a camming edge disposed along the opposite sides of the gate. A pin follower is carried by each extended portion and adapted to engage with and follow the camming edge. An energizing ring is disposed between the ring-shaped support element and the seal means. A compressible elastomeric seal ring is disposed between the energizing ring and the seal means such that movement of the ring-shaped support element forces the energizing ring against the compressible elastomeric seal ring to form the secondary seal upon closing and such that the slight movement of the ring-shaped support element away from the gate allows the energizing ring to be forced outwardly by the compressible, elastomeric seal ring to deenergize the seal between the seal means and the gate.

In another embodiment of the present invention, the valve further comprises a spring member having a selected spring constant positioned between the energizing ring and the ring-shaped support element such that the spring member is adapted to provide pressure relief for the seal means when a selected pressure level is reached.

In yet another embodiment of the present invention, the elastomeric seal ring is an O-ring comprised of elastomeric material. Additionally, the spring member may be comprised of a belleville spring of a selected spring constant.

In yet another embodiment of the present invention, the elastomeric seal ring comprises elastomeric material which includes an anti-extrusion member. Additionally, the spring member may be comprised of a belleville spring of a selected spring constant.

In yet another alternative embodiment of the present invention, the cooperating cam means includes a camming wedge slidably mounted along opposite sides of the gate with clearance between the camming wedge and the gate to allow the gate to freely float with respect to the wedge. The wedge includes a camming edge surface. The extended portion of the ring-shaped support element includes a pin follower carried thereon and adapted to engage with the camming edge surface of the camming wedge. Hence, the camming wedge provides for the camming action while allowing the gate to freely float within the limits of the clearance between the wedge and the gate.

In yet another alternative embodiment of the present invention, the cooperating cam means includes a camming wedge slidably mounted along opposite sides of the gate such that movement of the wedge is effected prior to movement of the gate upon opening of the gate. The wedge includes a camming edge surface. The extended portion of the ring-shaped support element includes a pin follower carried thereon and adapted to engage with the camming edge surface of the camming wedge. Hence, the camming wedge provides for lost motion during the opening of the valve during which the wedge releases and deenergizes the secondary seal prior to movement of the gate to open the valve.

In a preferred aspect of some of the alternative embodiments of the present invention, the gate valve further includes a spring member having a selected spring constant wherein the spring member is positioned between the ring-shaped support element and the seal means in order to provide pressure relief for the seal means.

In yet another alternative embodiment of the present invention, the present invention includes a gate valve comprising a valve body having a valve chamber therein and a pair of flow passages aligned at opposite sides of the valve chamber. A recess is disposed around the inner end of each of the aligned flow passages in the valve body. A gate member having an imperforate section and a section having a flow passage therethrough is disposed within the valve chamber and is reciprocally movable along a line substantially transverse to the valve chamber flow passages between a gate position in which the valve is open and the flow passage of the gate member aligns with the valve chamber flow passages, and a gate position in which the valve is closed and the imperforate section aligns with the valve chamber flow passages. A valve seat is disposed in each of the recesses around the inner end of the flow passages. Each of the valve seats comprises a ring-shaped seat against which the gate member slides between the open and closed positions such that the gate forms a primary seal with the ring-shaped seat. A seal support ring is slidably disposed around the ring-shaped valve seat. The seal support ring has an inner recess therearound at the end adjacent the gate. An elastomeric seal member is disposed in the inner recess of the seal support ring and a spring member having a selected spring value is positioned to activate or relieve the elastomeric seal member. In a preferred aspect of this embodiment, the spring member is a belleville spring having a selected spring constant.

Accordingly, the present invention provides a means for providing block and bleed facilities. The present invention also provides a means for quickly deenergizing the secondary seal through either a compressible elastomeric seal ring disposed between the secondary seal member and the ring-shaped seal support member wherein the decompression or elastic return of the seal ring "deenergizes" or relieves the secondary seal, or through means of a floating wedge adapted for movement prior to movement of the gate across the secondary seal or other suitable means.

In yet another alternative embodiment of the present invention designed to simplify and reduce the cost of the secondary seal assembly, the secondary seal assembly consists of a seal ring carrier, a face seal ring, and a seat outer diameter seal ring. Sealing contact between the secondary seal assembly and the gate is maintained by a spring means preferably a belleville spring.

A preferred embodiment of the secondary seal assembly provides gate guides as an integral part of the seal assembly.

BRIEF DESCRIPTION OF THE DRAWINGS

These and other advantages of the present invention will further be illustrated by reference to the appended drawings which illustrate particular embodiments of a gate valve constructed in accordance with the present invention and in which like parts are given like reference numerals, and wherein:

FIG. 4 is a horizontal cross section of the gate assembly taken at line IV—IV of either FIGS. 3 or 9B;

FIG. 5 is a plan view of a camming wedge constructed in accordance with the present invention;

FIG. 6 is a side view of the camming wedge shown in FIG. 5;

FIG. 7 is a horizontal cross section of the gate assembly taken along line IV—IV of FIGS. 3 or 9B, illustrating an alternative embodiment of the camming wedge adapted for evenly applying secondary seals;

DETAILED DESCRIPTION OF THE EMBODIMENTS

Figure 1:
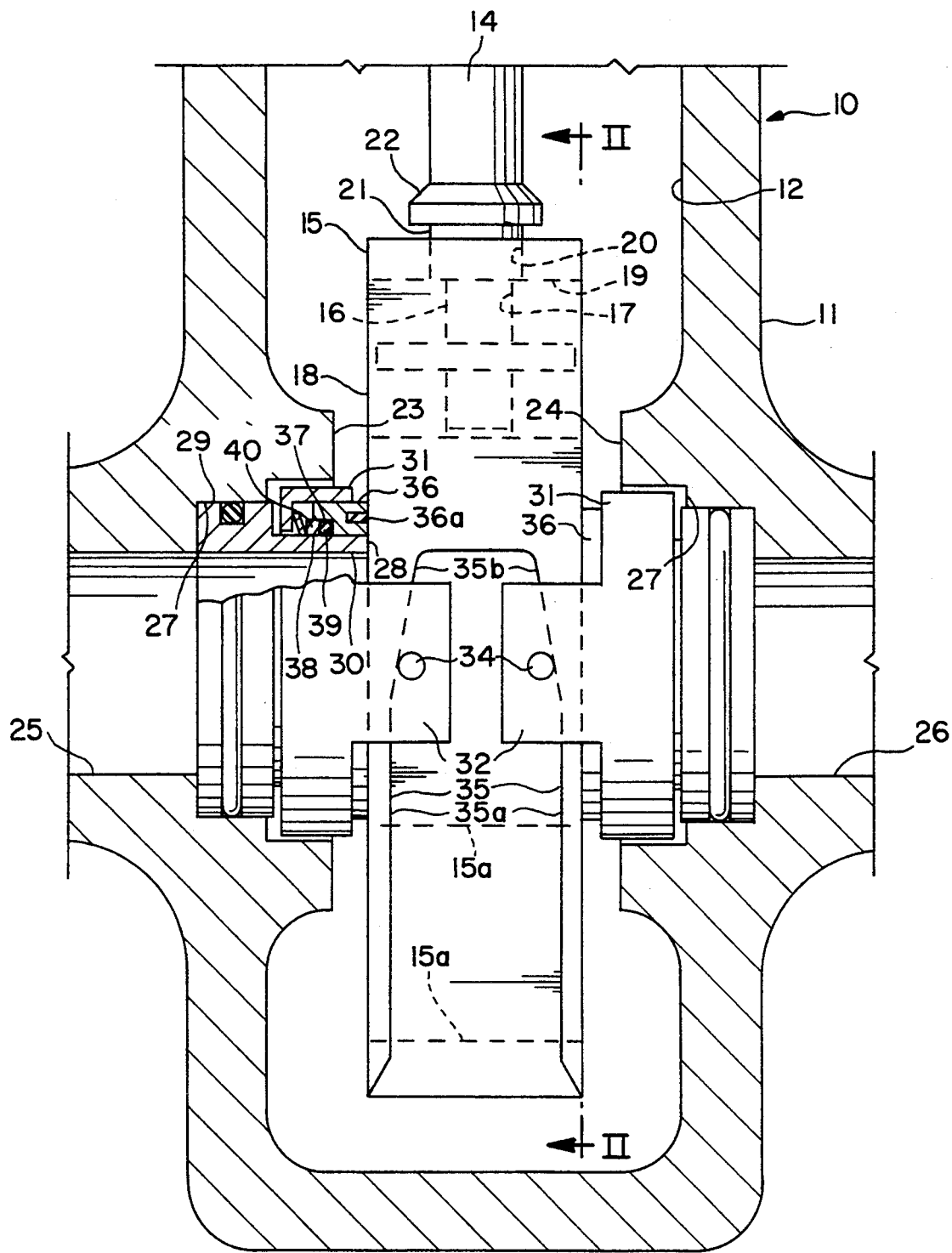
FIG. 1 is a vertical axial cross section illustrating a preferred embodiment of a gate valve constructed in accordance with the present invention.

Specific embodiments of a gate valve are illustrated which will accommodate the use of a secondary seal assembly. The gate valves illustrated are of a rising stem style similar to that shown in U.S. Pat. No. 4,377,273, which is incorporated herein by reference. It will become apparent to those skilled in the art in view of the above and below disclosure that the present invention could be similarly utilized with solid gate valves, split gate valves, balanced stem valves, or non-rising stem valves and other valves which use seats and seals that are not gate valves.

Referring to FIGS. 1 and 8A and 9A and 12 through 16, the gate valve 10 includes a valve body 11 which is hollow, having a valve chamber 12 therewithin. The upper or bonnet portion of the valve (not shown) may comprise a bonnet of any conventional form which provides a closure of the upper end of the chamber 12 and forms a seal between the valve body 11 and a stem 14.

The valve 10 includes a gate element 15 disposed within the chamber 12. The gate 15 has, generally, surfaces rectangular in section and is interconnected at the top with the stem 14. The stem 14 is adapted to raise and lower the gate 15 upon the selective movement of the stem 14.

Figure 8A:
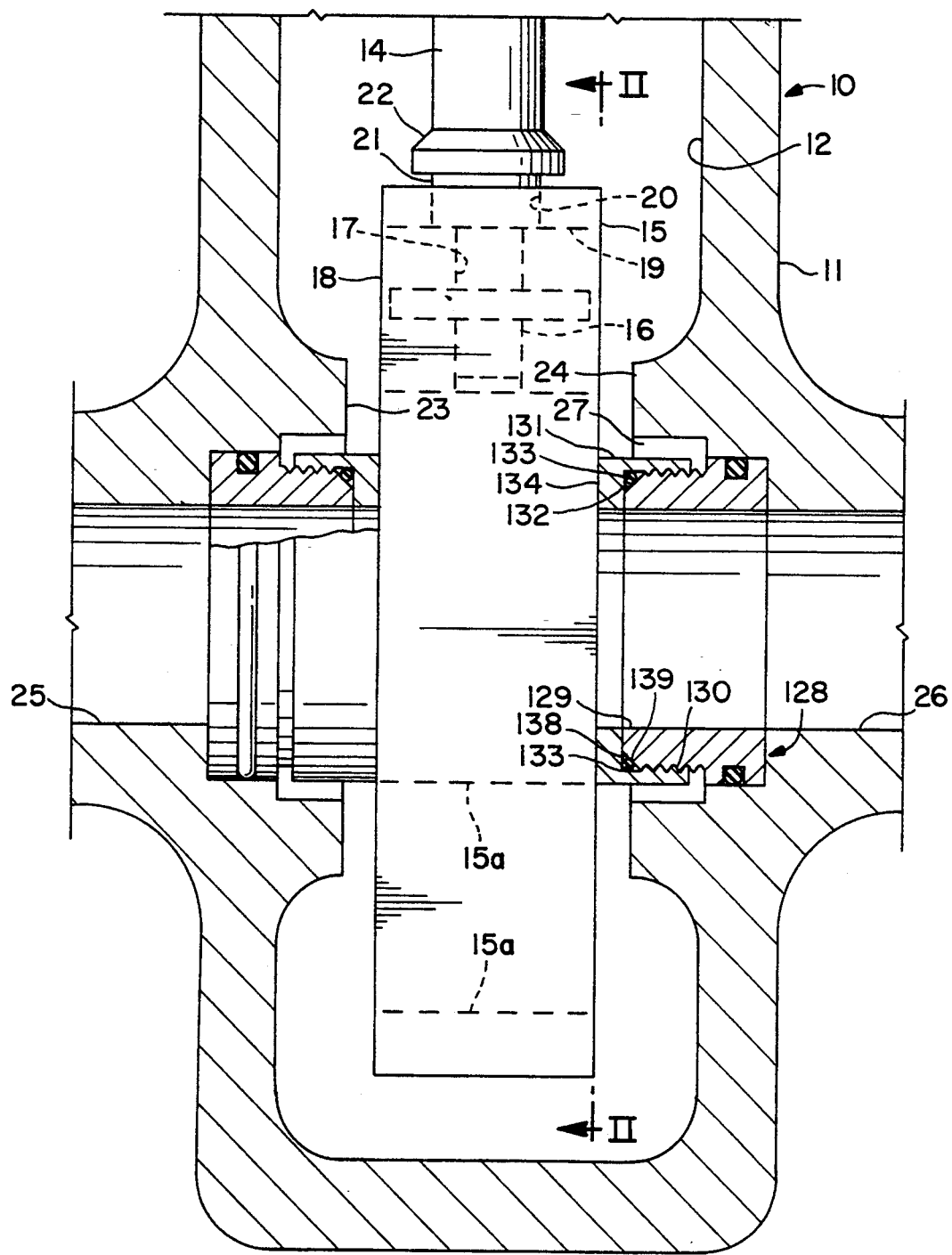
FIG. 8A is a vertical axial cross section illustrating an embodiment of a gate valve constructed in accordance with the present invention.
Figure 9A:
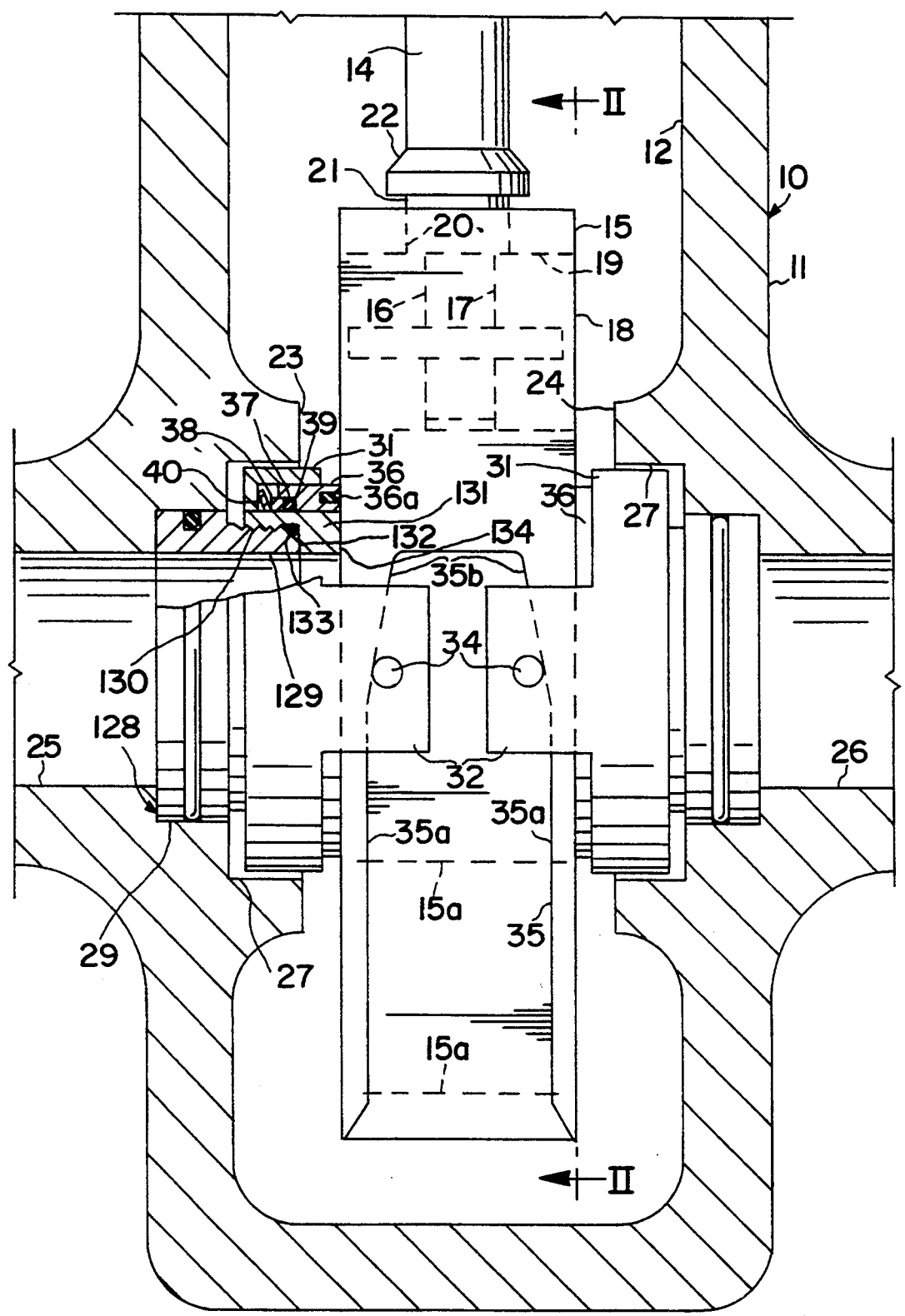
FIG. 9A is a vertical axial cross section illustrating another preferred embodiment of a gate valve constructed in accordance with the present invention.

Referring still to FIGS. 1 and 8A and 9A, the lower end of the stem 14 may take the form of a threaded stud 16 which is screwed and pinned into a tapped diametric opening 17 of a cylinder 18 which is received within a cylindrical opening 19 of the gate 15. The threaded stud 16 is connected to a cylindrical portion 21 of the stem 14 which is in turn received into an opening 20 of the gate 15. An upward conical formation 22 is formed around the stem 14 above the cylindrical portion 21 to provide a stop to prevent excessive upward movement of the stem by contact of formation 22 with the underside of the bonnet (not shown).

Vertical movement of the stem may be provided in a variety of manners. In the embodiment illustrated, the stem 14 may typically have threaded engagement with a yoke nut (not shown), so that rotation of the nut causes longitudinal movements of the stem 14 and the gate 15 in either direction.

It will be appreciated by those of skill in the art that these and other suitable means for attaching the stem 14 to the gate 15 may be utilized in accordance with the present invention.

Referring again to FIGS. 1 and 8A and 9A and 12, two opposite formations 23, 24 project into the chamber 12 of the valve 10 around the inner ends of the opposed aligned flow passages 25, 26 of the valve body 11. The gate 15 has a flowport 15a therethrough which is positioned such that when the gate is moved upwardly in FIGS. 1 and 8A and 9A and 12 through 16 to be opened, the flow port 15a aligns with passages 25 and 26.

Figure 2:
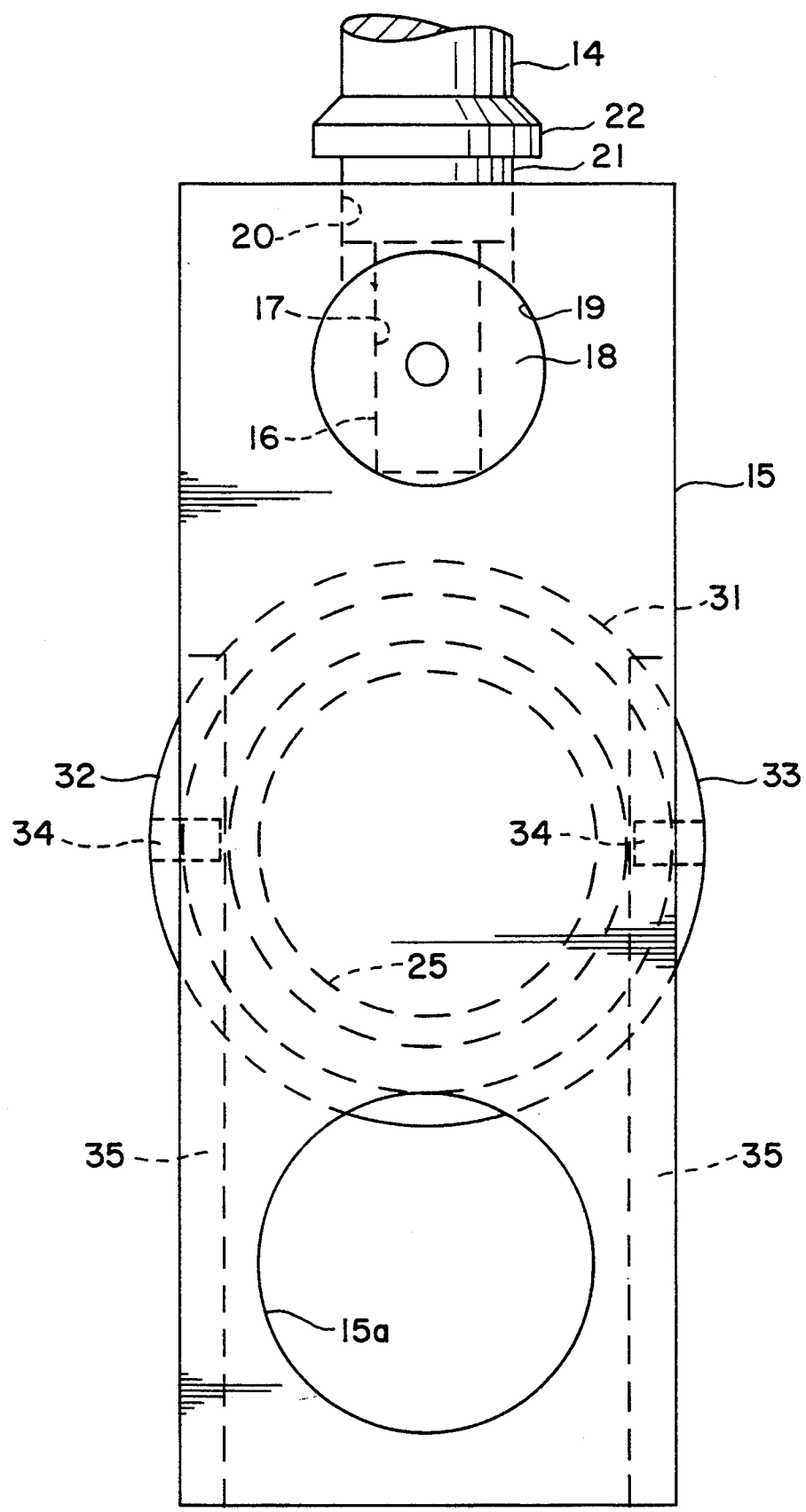
FIG. 2 is a vertical cross section taken at line II—II of FIGS. 1 or 8A.
Figure 3:
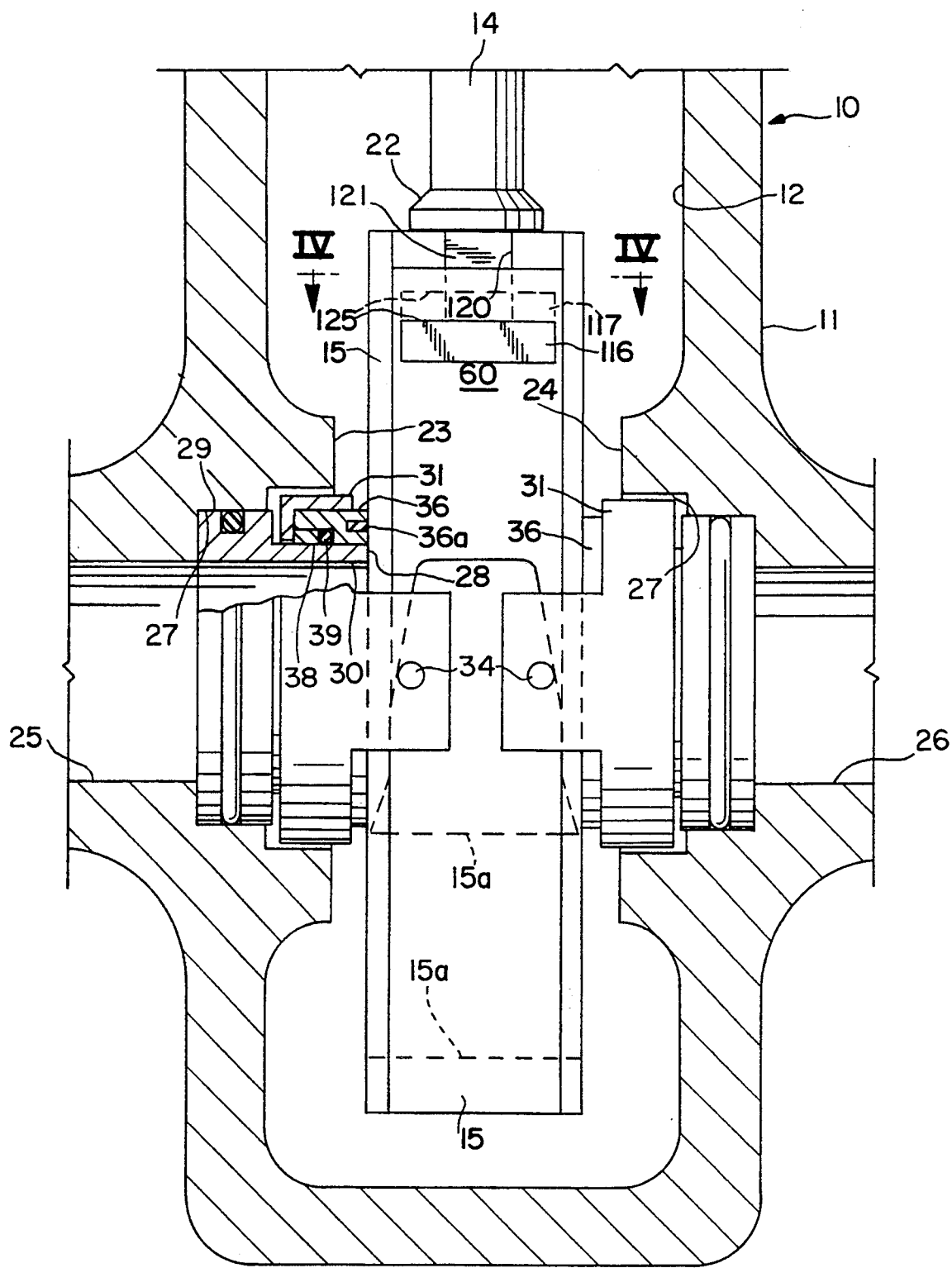
FIG. 3 is a vertical axial cross section illustrating an alternative preferred embodiment of the gate valve incorporating the camming wedge in accordance with the present invention.
Figure 12:
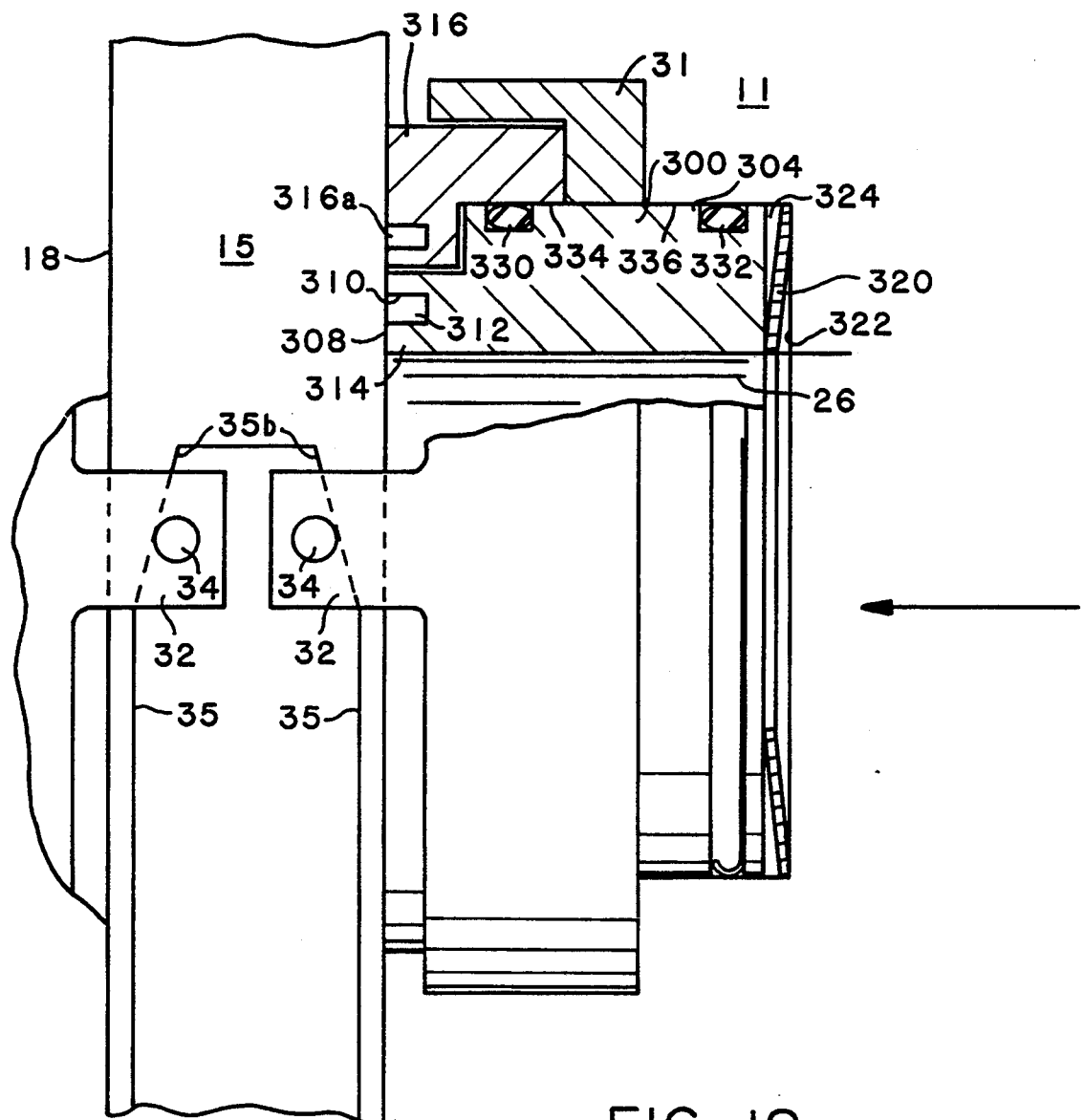
FIG. 12 is a partial vertical axial cross section illustrating an alternate preferred embodiment of a gate valve for block and bleed constructed in accordance with the present invention and wherein a spring is inserted to urge the seat against the gate.

A stepped annular recess 27 is formed around each of the flow passages 25, 26 concentrically into formations 23, 24. In the embodiment of FIGS. 1–3, a valve seat member 28 having an outwardly enlarged portion 29 is mounted in the bottom of the recess 27. In the embodiments of FIGS. 8A, 8B, 9A, 9B, 9C, 9D, a valve seat body member 128 is mounted in the bottom part of recess 27. In the embodiment of FIG. 12, a valve seat body member 300 is mounted in the bottom part of each recess 27. In FIG. 12, valve seat member 300 has enlarged portion 304.

Referring to FIG. 8A, seat body member 128 includes tubular portion 129 and ring shaped seat face member 131, with threaded outside diameter 130 of portion 129 threadingly engaging ring shaped seat face member 131. The inner face of seat face member 131 engages and abuts the outer end face 132 of the tubular portion 129 of seat body member 128 creating a metal-to-metal seal along surface 132. Resilient seal member 133 is disposed in annular opening 138 between tubular portion 129 and seat face 131 to create a secondary seal between tubular portion 129 and seat face member 131 to create a secondary seal between tubular portion 129 and seat face member 131. Annular opening 138 formed by frusto-conical surface 139 at the upper, inner end of tubular portion 129. Outer face 134 of seat face member 131 engages gate 15 creating a metal-to-metal seal between seat face member 131 and gate 15 along the surface of face 134.

Figure 8B:
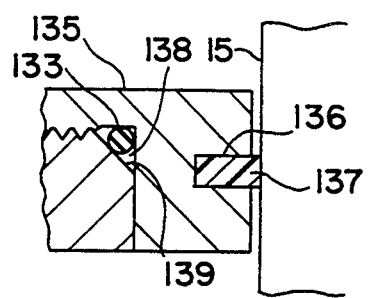
FIG. 8B is a vertical axial cross section of a three piece seat assembly shown in FIG. 8A.

Referring to FIG. 8B, an alternative seat face member 135 which may replace seat face member 131 of FIG. 8A is shown. Seat face member 135 includes a groove 136 in which is mounted resilient face seal ring 137 of materials such as rubber, Teflon or other elastomerics to create a resilient seal between seat face member 135 and gate 15 and seal 137. This embodiment does not require the machining tolerance necessary for metal-to-metal sealing and would be significantly less expensive in lower pressure applications, whether or not secondary seals are used.

Referring to FIG. 12, the seat face 308 of seats 300, 302 are of the same design and for the same reasons as the seat face member 135 of FIG. 8B. Each seat face 308 includes a groove 310 in which is mounted resilient face seal ring 312 of materials such as rubber, Teflon or other elastomerics to create a resilient seal between seat face 308 and gate 15 and seal ring 312.

Figure 9B:
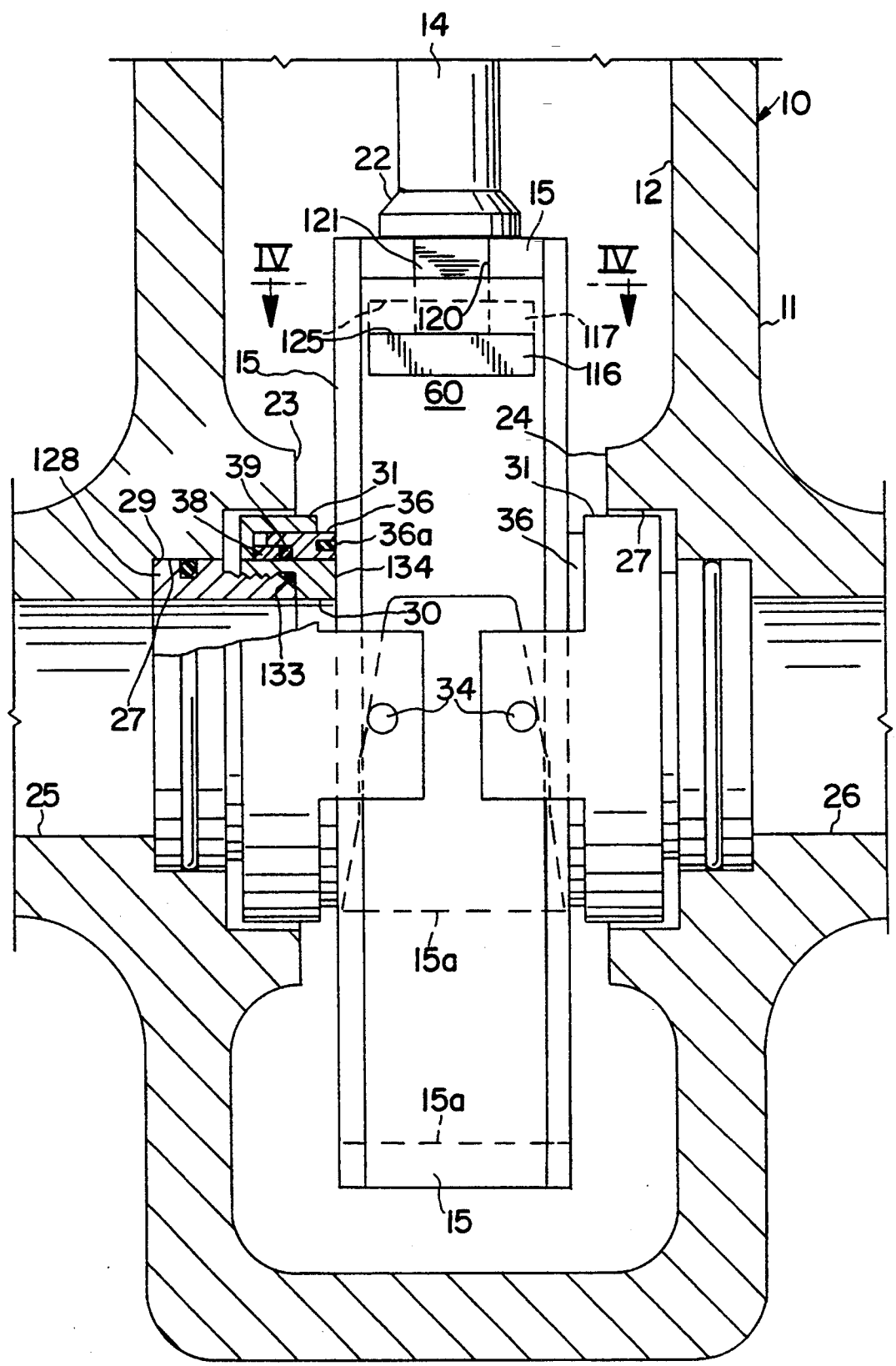
FIG. 9B is a vertical axial cross section illustrating an alternative preferred embodiment of the gate valve incorporating the camming wedge in accordance with the present invention.

As shown in FIGS. 1 and 9A and 12, a seal support ring 31, forming the main body portion of the supplemental or secondary seal, is disposed around the exterior surface of extended tubular portion 30 (FIG. 1) or 314 (FIG. 12) or the ring-shaped seat face member 131 of the seat body member 128 (FIG. 9A) or 134 (FIG. 9B). The seal support ring 31 is generally ring-shaped and has an inwardly relieved recess at its end toward the gate 15 such that the seal support ring 31 has an L-shaped configuration in cross section. The seal support ring 31 further includes a pair of extending portions 32, 33 which extend along the opposite sides of the gate 15 as best shown in FIG. 2. Each extending portion 32, 33 has a short cylindrical pin 34 fixed to a flat inwardly facing surface along the gate 15. The gate 15 further includes a camming edge 35 disposed along each of its sides. Each camming edge 35 has a vertical portion 35a at its lower end, above which is provided a slanted portion 35b. The pins 34 are engaged with the camming edge 35 in a cam and follower manner. When the gate 15 is moved downwardly toward a closed position by downward movement of the stem 14, the pins 34 move along the edge 35 from a position along portion 35a (not shown) toward a position along portion 35b to move the ring support element 31 toward the gate as shown in FIGS. 1 and 9A.

In U.S. Pat. No. 4,377,273, camming edges were provided by grooves 45 having front and back edges for closing and opening the secondary seal. As particularly shown in FIG. 1, and all other FIGURES except FIGS. 8A and 8B, and in U.S. Pat. No. 4,377,273, incorporated herein by reference as set out above, the secondary seal should be initially made up mechanically to cause the secondary seal 36a (generally), 140a (FIGS. 9C, 9D, and 9E), to sealingly engage the face of gate 15 (presuming flow is from flow passage 26 to flow passage 25). Thereafter, if there is any leakage around the primary metal-to-metal or elastomeric seal, the force from the pressure of the fluid in the body of the valve acting on seal means 36 (generally), 140 (FIGS. 9C, 9D and 9E) to force the seal 36a, 140a located in a groove in seal means 36, 140, 316, respectively, into engagement with the gate face will be significantly greater than the force from the pressure of the fluid in the passage 25 of the valve acting on seal means 36, 140 to force the seal 36a, 140 out of the engagement with the gate face.

Both of these forces will usually be significantly greater than the mechanical force of the spring member 40. It has been found, however, that the fluid pressure within the valve can be used to act to open the secondary seal, and that the back edge of the groove 45 shown in U.S. Pat. No. 4,377,273 may be eliminated, as shown in FIGS. 1, 3, 9A and 9B of the present disclosure.

Referring still to FIGS. 1 and 9A, a secondary seal member is provided which includes seal means 36 supported by the ring-shaped support element 31 such that movement of the seal support ring 31 forces the seal means 36 to engage the gate 15 to form a secondary seal.

In order to perform a block and bleed test, the seat to gate seal must seal on the upstream side. FIG. 12 shows several upstream seal designs utilizing closed seals. Referring still to FIG. 12, as discussed above, a secondary seal member is provided on the upstream and downstream sides of the valve 10. Each of the secondary seal members includes seal means 316, supported for FIG. 12 by a ring-shaped support element 31. For FIG. 12, the ring-shaped support element 31 is such that movement of ring-shaped support element 31 forces the seal means 316 to engage the gate 15 to form a secondary seal. See U.S. Pat. Nos. 4,377,273 and 4,566,671 and U.S. application Ser. No. 493,045, filed Mar. 12, 1990, now abandoned, U.K. Patent 2,150,265, and Canadian Patent 1,260,908. In addition, a spring 320 (FIG. 12) is provided between surface 322, formed at the interface shoulder between annular recess 27 and flow passage 26, and outer surface 324 of seat 300 (and a corresponding one on the downstream side of valve 10).

For FIG. 12 a pair of annular resilient seals 330, 332 are mounted to the seat 300, 302 by suitable means, the inner seal 330 sealing against the lower surface 334 of secondary seal 316 and the outer seal 332 sealing against the surface 336 of valve body 11.

For FIGS. 1 and 9A, the seal means 36 is comprised of a stepped annular ring having an inner recess 37 such that the seal means 36 is somewhat L-shaped in cross section. The seal means 36 may further include an annular resilient seal element 36a mounted to the seal means 35 by press fitting or other suitable means.

Figure 10:
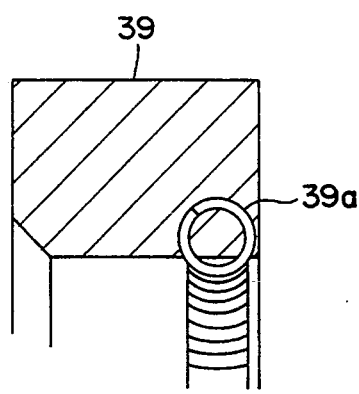
FIG. 10 is a cross section of an alternate seal.

The valve 10 for some embodiments further includes a means for deenergizing the secondary seal prior to substantial linear movement of the gate 15 across the fully energized seal means 36. In the embodiment illustrated in FIGS. 1 and 9A, the means for quickly deenergizing the secondary seal includes an energizing ring 38 slidably disposed within the inner recess 37 and a compressible, elastomeric seal ring 39 disposed between the energizing ring 38 and the seal means 36. The seal ring 39 may be comprised of any material having suitable compressible, elastomeric properties such that upon movement of the energizing ring 38 to compress the seal ring 39 when the secondary seal is effected, the seal ring 39 compresses and spreads outwardly to form a fluid tight, essentially incompressible seal. In an embodiment, the seal ring 39 is comprised of a compressible, elastomeric O-ring having a substantially circular cross section. In the preferred embodiment of FIG. 10, the seal ring 39 is comprised of a compressible elastomeric ring which incorporates an anti-extrusion element 39a. At high operating pressures, elastomers tend to extrude through gaps, as well is known in the art. Accordingly, because seal ring 39 is an elastomer, it will tend to extrude. By placing a metal ring or other well known anti-extrusion element 39a at the corner of elastomer ring 39 as shown in FIG. 10, elastomer 39 will not be able to extrude past the ring 39a.

Some preferred embodiments may further include a means for providing pressure relief for the seal means 36. In the illustrated embodiment of FIGS. 1 and 9A, the pressure relief means includes a spring member 40 disposed between the base of the seal support ring 31 and the energizing ring 38. The spring member 40 has a selected spring constant of a value selected such that once a seal between the seal means 36 and the gate 15 is effected, the spring member 40 exerts a given force. As best seen in FIG. 1 and FIG. 9A, when the cam 36b with pins 34 is uncammed, spring 40 urges seal support ring 31 away from the gate and rings 38, 39, allowing body pressure to bypass seal ring 39, entering the area between gate 18 and seat 28 below seal 36a, equalizing the pressure across seal 36a and relieving it. The compression of the spring 40, in turn, allows the seal means 36 to move away from the gate 15 on the upstream side in order to prevent destruction of the resilient seal element 36a.

It will be understood that the selection of a particular spring constant is dependent upon the materials comprising seal means 36, seal ring 39, and seal element 36a, and for FIG. 12, the material of primary seal element 312, and their ability to withstand or maintain a certain threshold pressure. Such selection is a matter of design which will be known to those of skill in the art in view of the present disclosure.

The spring members 40, 320 may be comprised of a number of suitable springs providing the desired spring value for a particular design of sealing means. In the preferred embodiment, the spring members 40, 320 are comprised of a belleville spring having a suitable spring value selected to yield at a desired level of pressure. It may also be an O-ring seal such as O-ring 326.

The embodiments of the present invention illustrated in FIGS. 1, 9A, and 9B provide both a means for upstream pressure relief and a means for quickly deenergizing the seal 36.

The gate valve of the present invention may alternatively include a cooperating cam means which comprises a camming wedge slidably mounted along opposite sides of the gate such that movement of the wedge is effected prior to the movement of the gate upon the opening of the gate, whereby the secondary seal is deenergized prior to movement of the gate across the seal. Referring to FIGS. 3–6 and 9B, in which like members to FIGS. 1 and 9A and 12 are given like reference numerals, the preferred embodiment of a gate valve incorporating such a camming wedge is shown. In the description of the embodiment shown in FIGS. 3–6 and 9B, the terms "vertical" and "horizontal" are used in reference to a valve having the orientation shown in FIGS. 3 or 9B, wherein a valve is shown in the upright position with the stem extending upwardly out of the top of the valve.

Referring first to FIGS. 5 and 6, the camming wedge 60 has a generally rectangular configuration having a lower recess 62 extending therein. The recess 62 includes camming edges 35 which are essentially identical in function and similar in configuration to the camming edges 35 shown in FIGS. 1 and 9A and 12–14. In particular, the camming edge 35 has a vertical position 35a at its lower end and an upper slanted portion 35b. As described for FIGS. 1 and 9A and 12, the camming edge 35 engages in use with the pins 34 in a cam and follower manner such that when the gate 15 is moved downwardly to a closed position by the downward movement of the stem 14, the pins 34 move along the edge 35 from a position along edge 35a toward a position along edge 35b to move the ring support element 31 toward the gate 15 to form the secondary seal.

The wedge 60 also includes a pair of opposing tabs 64 extending outwardly from either side to engage within mating channels 126 in the gate 15 such that the gate 15 slidably supports the wedge 60 for longitudinal movement as shown in FIGS. 3, 9B and 4. The wedge 60 additionally comprises a horizontal slot 68 having a generally rectangular configuration in cross section. As will be explained in greater detail below, the horizontal slot 68 is configured to fit onto the lower portion of the stem 14 such that play between the wedge 60 and the stem 14 in the vertical direction is minimized.

Referring to FIGS. 3 and 9B, the lower portion of the stem 14 includes a longitudinal section 121 having a rectangular configuration in horizontal cross section. A transverse member 116, also having rectangular sides and bottom, is secured to the longitudinal section 121 such that the two members are configured in the form of an inverted block T. As shown in FIGS. 3 and 9B, in the preferred embodiment, the horizontal width of the transverse member 116 is greater than the horizontal width of the longitudinal member 121, but less than the corresponding width of the gate 15. Further, the horizontal length of the transverse section 116 is greater than the horizontal length of the longitudinal member 121, but substantially equal to the corresponding horizontal length of the gate 15. As shown in FIGS. 3 and 9B, the transverse section 116 is configured at each end to be slidably received within the horizontal slot 68 of the wedge 60 such that freedom of play between the wedge 60 and the horizontal slot 68 in the vertical direction is minimized.

The gate 15 includes a longitudinal slot 120 (FIGS. 3 and 9B) adapted to slidably receive the longitudinal section 21 and a transverse slot 117 adapted to slidably receive the transverse section 116. The longitudinal slot 120 is configured such that it slidably receives the longitudinal section 121 and provides limited freedom of latitudinal movement of the gate 15 in relation to the stem 14. The transverse slot 117 has a greater vertical dimension than the transverse section 116 such that a selected length 125 of vertical movement of the stem 14 is provided without corresponding movement of the gate 15.

For purposes of assembly, it should be understood that in the illustrated embodiment, the horizontal cross sectional width of the longitudinal section 121 is not critical so long as a width is selected to provide suitable strength for the load expectations on the stem 14. Similarly, the horizontal-cross sectional length of the section 121 is not critical, but must be sufficiently less than the horizontal cross sectional length of the gate 15 to accommodate the sliding of the stem 114 to one side of the gate 15 to accommodate installation of the wedges 60. This clearance is best illustrated in FIG. 4. It will be appreciated that other configurations of the stem 14, wedge 60, and gate 15 may be utilized to accommodate assembly of the three members in accordance with the present invention.

Accordingly, when the valve 10 is in a closed position, as shown in FIGS. 3 and 9B, the secondary seal has been effected by the downward movement of the camming wedge 60. When it is desired to open the valve, the upward movement of the stem 14 for the selected distance 125 will raise the camming wedge 60 without a corresponding movement of the gate 15. This "lost motion" allows the camming wedge 60 to substantially release the secondary seal before any upward movement of the gate 15 is provided.

In this regard, it should be noticed that upon the movement of the gate 15 downwardly to close the valve, the drag of the primary seal upon the gate 15 will cause the gate 15 to seek the highest position as shown in FIGS. 3 and 9B. Alternatively, lower stops could be provided for the gate 15 whereby the gate "bottoms out" against such a stop to insure that the freedom for lost motion is provided upon the upward movement of the stem 14.

Referring again to FIG. 6, an alternative design for the camming edges 35 shown in FIGS. 1, 3, 9A, and 9B and 12, is disclosed which provides a means for limiting the force with which the secondary seal is effected. In particular, the camming edges 35 may be configured to include an upper vertical portion 35c (shown ghosted). The vertical portion 35c is disposed substantially parallel to the side of the gate 15 in use such that the engagement of the follower pin 34 with the edge 35c will cease movement of the ring shaped support element 31 toward the gate 15 and will thereby cease further tightening of the secondary seal.

Referring now to FIG. 7, there is shown an alternative embodiment of the camming wedge 60 of FIGS. 5–6 adapted to center the gate 15 between opposing secondary seals such that the secondary seals are evenly applied. As shown in FIG. 7, the wedge 60 may have the same basic configuration in horizontal cross section as the wedge 60 shown in FIG. 4. In the embodiment shown in FIG. 7, however, the wedge 60 is of a dimension such that when the wedge 60 is mounted onto the gate 15, clearance is provided between the tabs 64 and the bottom of the mating channels 126 and between the wedge 60 and the gate 15 in order to allow latitudinal movement of the wedge 60 in relation to the gate 15 as shown by the arrow 66.

Accordingly, when wedges having clearance for such latitudinal movement are mounted to the gate 15 as shown in FIG. 7, the wedges float to compensate for misalignment of the gate between the opposing secondary seals and insure that the seals are evenly applied to the opposing sides of the gate 15.

Figure 11:
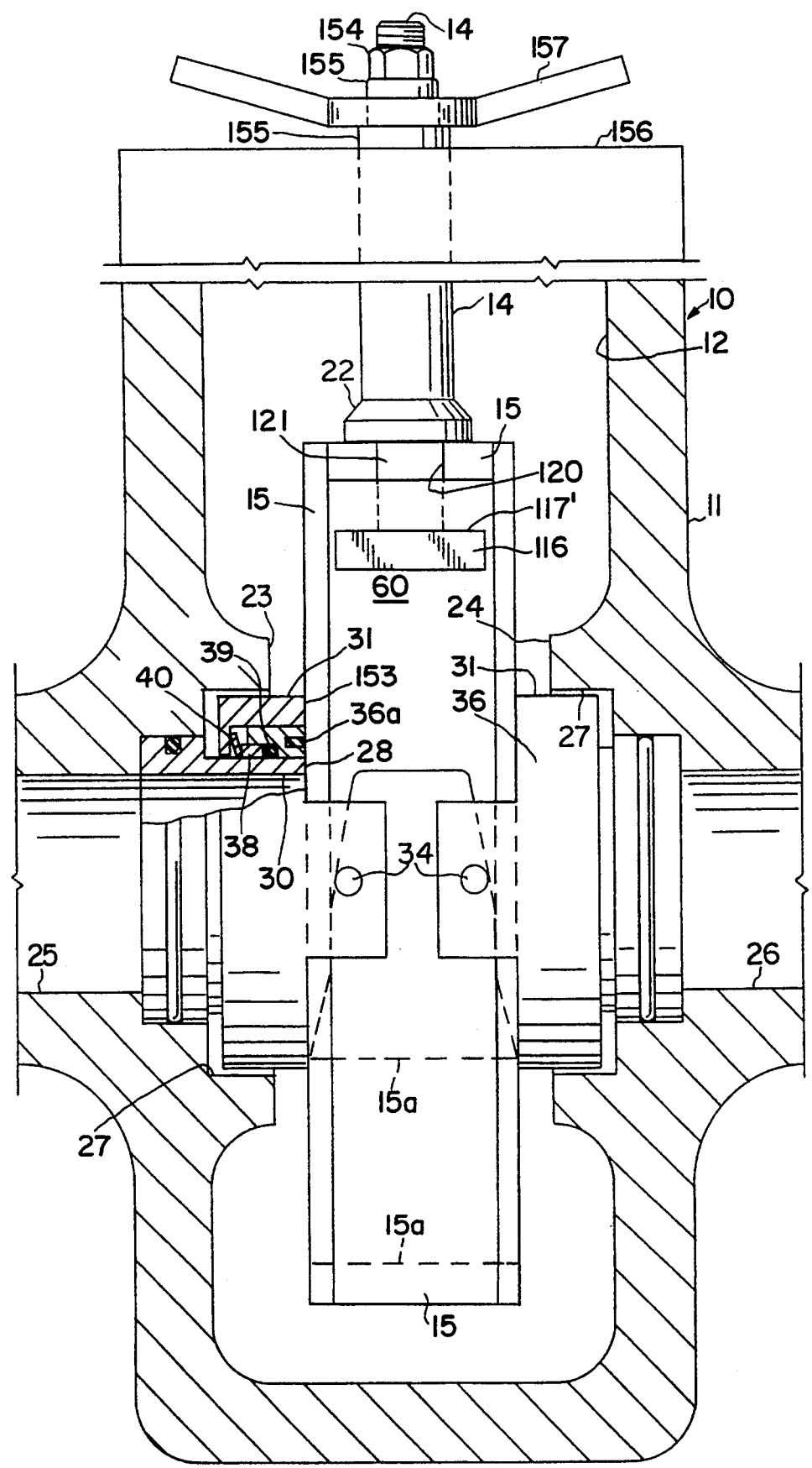
FIG. 11 is a vertical axial cross section illustrating the preferred embodiment of a gate valve constructed with a wedge having no lost motion and spring relief in accordance with the present invention.

Referring to FIG. 11, the preferred embodiment of use of a wedge 116 without space 125 of FIGS. 3 and 9B and with the spring 40 of FIGS. 1 and 9A is shown. The lack of space 125 yields a transverse slot 117 substantially as wide as wedge 116. Additionally, this embodiment may have the multi-piece seat 128 of FIGS. 8A, 8B, 9A and 9B. In addition, as seen in FIG. 11, the yoke includes a preferred method of limiting tightening of the secondary seal by compression of spring 40. The inward travel of seal support ring 31 toward gate 15 is limited to prevent compressing spring 40 solid. The limitation of the travel of seal support ring 31 is accomplished by inner face 153 of seal support ring 31 abutting gate 15. The seal support ring 31 is then prevented from scouring the face of gate 15 by stopping any further downward movement of the gate 15 after seal support ring face 153 contacts the gate 15. Downward movement of the gate is limited by stopping the downward movement of stem 14. Limitation of the downward movement of the stem 14 is accomplished by supplying a stop nut 154 on the outer end of stem 14 and adjusting stop nut 154 to stop on a stem nut 155 located between bonnet 156 and handle 157. The adjustment of stop nut 154 to a position where it stops against stem nut 155 should coincide with the abutting of seal support ring surface 153 with the face of gate 15. Limiting the downward movement of the stem 14 also prevents overstressing camming wedge 60, seal support ring 31, gate 15 and stem 14.

Figure 9C:
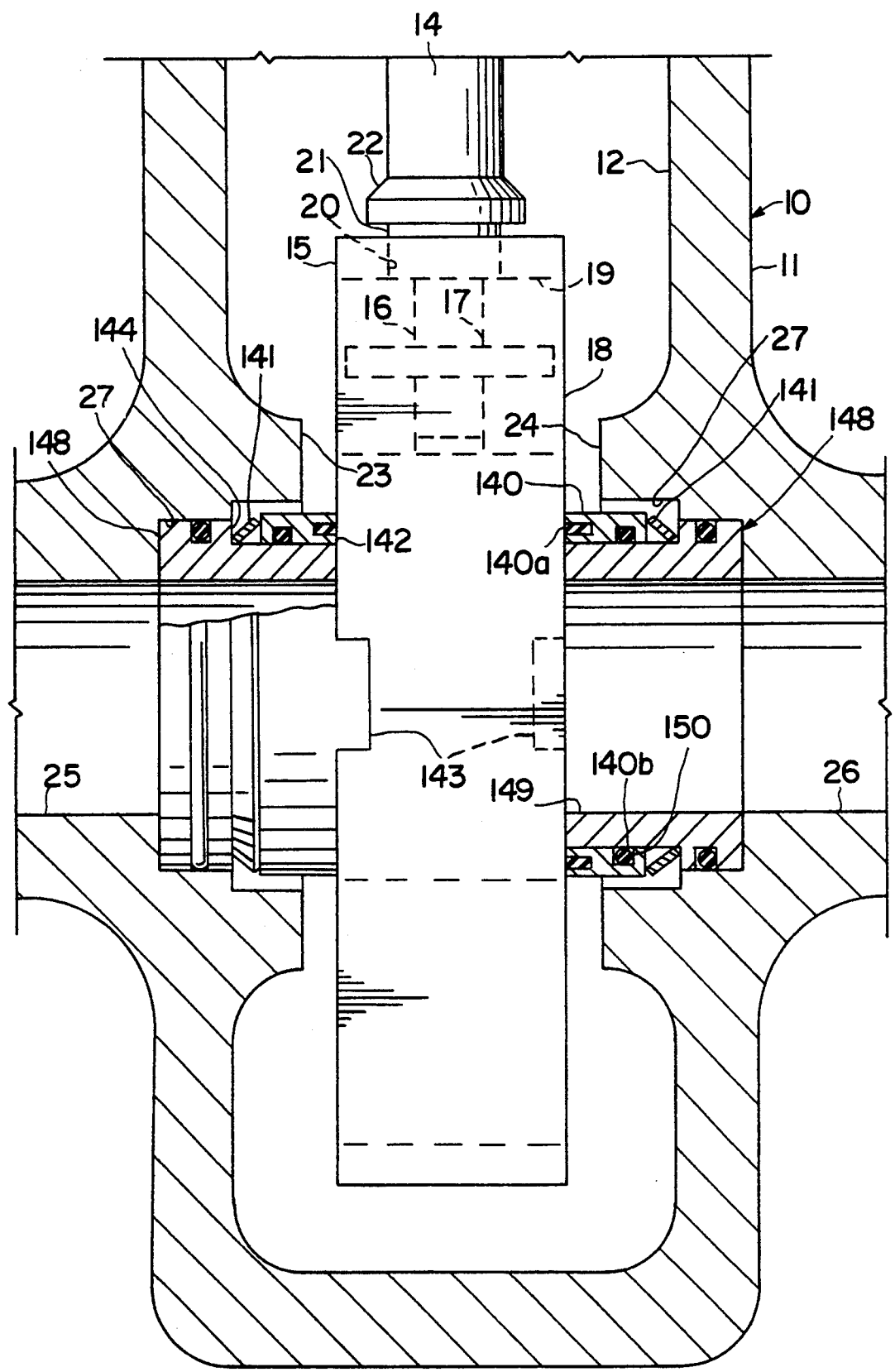
FIG. 9C is a vertical axial cross section illustrating an alternative preferred embodiment of the gate valve incorporating a simplified secondary sealingly assembly.

Referring to FIG. 9C, for an alternate secondary seal, seat body member 148 includes tubular portion 149 to slidingly engage ring shaped secondary seal member 140. Secondary seal member 140 includes an annular ring body having an annular resilient element 140a mounted to the inward facing surface 142 of the body of secondary seal member 140 by press fitting or other suitable seal means. Secondary seal member 140 further includes an O-ring, "T" ring or other suitable seal ring 140b received in a groove 150 of the body adapted to sealingly engage the outward facing surface of tubular member 149. In the illustrated embodiment of FIG. 9C, the secondary seal means includes a spring member 141 disposed between secondary seal member 140 and the shoulder 144 on seat body member 148. Alternately, an annular ring extension 152 (FIG. 9D) may be a part of seat body members 148 to form a pocket 145 for the spring 141. Spring member 141 maintains the contact between the secondary seal means and the gate 15 at surface 142. The spring member 141 will compress when a given force is exerted on the secondary seal means to move away from the gate 15 on the upstream side in order to prevent destruction of the resilient seal element 140a on the upstream side.

Figure 9D:
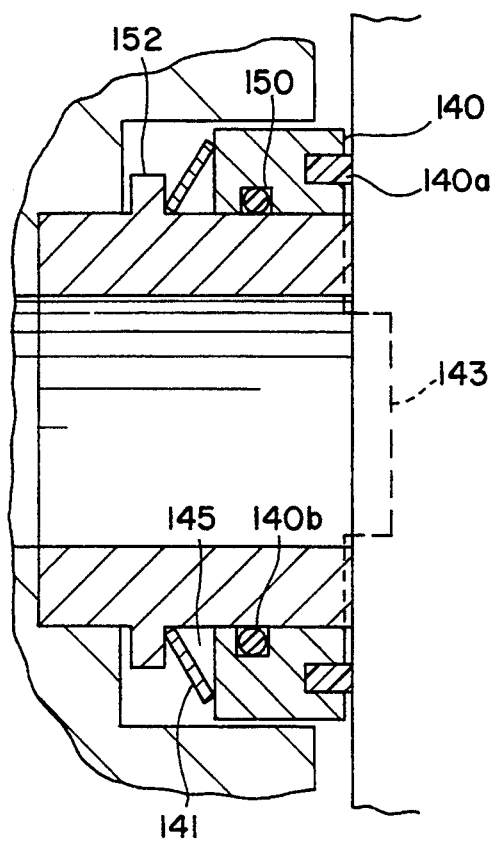
FIG. 9D is a vertical cross section of the simplified secondary seal assembly used in FIG. 9C.
Figure 9E:
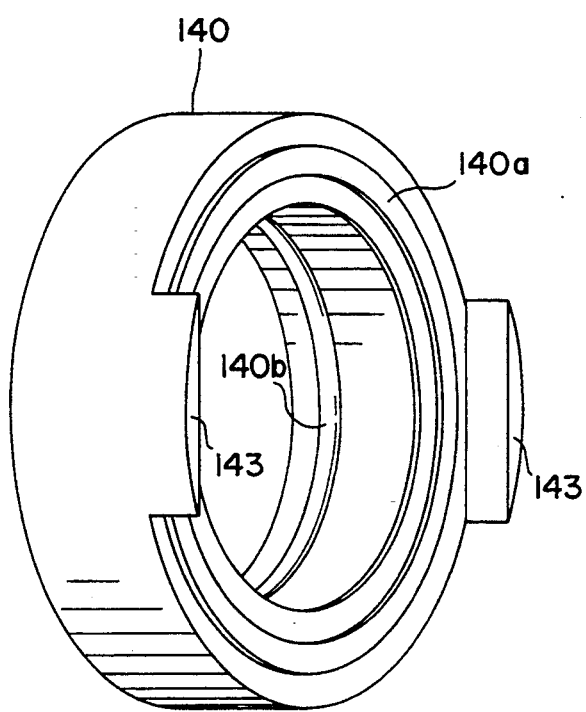
FIG. 9E is a perspective view of the valve seat having gate guides.

In the preferred embodiment of FIG. 9C, seat member 140 incorporates gate guides 143 which extend along opposite sides of the gate 15 as best shown on FIGS. 9D and 9E.

The spring 141 may be made of a belleville spring, elastomeric "O"-ring or other suitable material.

In FIG. 12, in closing, on the upstream side the seat 300 is urged against the gate 15 by means of spring 320. The spring 320 provides the initial force to urge the seal 300 against the gate 15. The pressure in the upstream line 26 then acting on the differential annular area between the seal 330, 332 on the outer diameter of the seat 300 and the seat face seal 312 urges the seat 300 against the gate 15. The pressure load will be in direct proportion to the line 26 pressure. This seat design is shown in U.S. Pat. No. 4,377,273. The seat 300 to gate 15 seal 312 is the primary seal. The secondary seal 316 is moved to contact the gate 15 by means of the yoke 31 as shown in U.S. Pat. Nos. 4,377,273 and 4,566,671. If the primary seat seal 312 leaks, the secondary 316 sealing load will be the line pressure times the differential annular area between the seal 330 on the seat 300 outer diameter and the secondary face seal 316a. A comparable result occurs on the downstream side.

With the design shown in FIG. 12 by utilizing a dual seal system shown in FIG. 12 on both the upstream 26 and downstream 25 sides of the gate 15, a double block and bleed test can be performed for so long as pressure is trapped in lines 25, 26, both of the primary 312 and/or secondary 316 seals will activate in the upstream 26 and downstream 25 sides as described above. Therefore, by bleeding the valve body 11 pressure to atmosphere both the upstream and downstream seals will be tested to determine if they are sealing.

The instant invention has been disclosed in connection with specific embodiments. However, it will be apparent to those skilled in the art that variations from the illustrated embodiments may be undertaken without departing from the spirit and scope of the invention. For example, the camming wedge 60 of FIG. 7 could further be incorporated into the embodiment shown in FIGS. 1, 9A and 12, without the provision for lost motion between the gate and the stem upon the opening of the valve. Additionally, the pressure release means or spring member could be incorporated into the embodiment shown in FIGS. 3 and 9B to insure that the seal means 36 would yield when a selected pressure level was reach upstream. Also, the split seat mechanism could be incorporated into the embodiments of FIGS. 9C and 12. Further, the secondary seal and split seat mechanisms may be used in other types of valves, such as plug, ball and butterfly valves.

Accordingly, because many varying and different embodiments may be made within the scope of the inventive concept herein taught including equivalent structures or materials hereafter thought of, and because many modifications may be made in the embodiments herein detailed in accordance with the descriptive requirements of the law, it is to be understood that the details herein are to be interpreted as illustrative and not in a limiting sense.

What is claimed is:

1. A gate valve, comprising:
    (a) a valve body having a valve chamber therewithin and a pair of flow passages through said valve body aligned at opposite sides of said valve chamber, said valve body further having a recess around the end of each of said aligned flow passages facing said valve chamber, one of said flow passages being an upstream passage and the other of said flow passages being a downstream passage;
    (b) a ring-shaped seat member disposed in each recess around the end of said flow passages facing said valve chamber;
    (c) a gate in said chamber having an imperforate section for preventing fluid flow in a closed position of said gate and a section with a flow passage there through for permitting fluid flow in an open position of said gate, said gate forming a primary seal with the ring-shaped seat member in said upstream flow passage;
    (d) a secondary seal member disposed around the ring-shaped seat member in said upstream flow passage and adapted to reciprocate on said ring-shaped seat member, said secondary seal member comprising a ring-shaped support element including at least one extended portion extending to and juxtaposed with a side of said gate and a seal mounted in said support element facing said gate;

(e) cooperating cam means associated with said gate and said ring-shaped support element for moving said ring-shaped support element toward said gate when said gate is moved toward the closed position to form contact between the secondary seal member and the gate;

(f) urging means supported by said valve body for moving said ring-shaped seat toward said gate to form a primary seal between said gate and said seat; and (g) second seal means between said ring-shaped seat and said secondary seal members and between said ring-shaped seat and said valve body for sealing said ring-shaped seat with said secondary seal member and said valve body.

2. A gate valve having an upstream side and a downstream side subject to upstream pressure from fluid passing through the valve from upstream to downstream, comprising:

(a) a valve body having a valve chamber therein and a pair of flow passages aligned at opposite sides of said valve chamber, and additionally having a recess around the end of each of said aligned flow passages facing said valve chamber, one of said flow passages being an upstream passage on the upstream side and the other of said flow passages being a downstream passage on the downstream side;

(b) a gate member having an imperforate section and a section having a flow passage therethrough, said gate member being disposed within said valve chamber and being reciprocally movable along a line substantially transverse to said valve chamber flow passages, between a gate position in which the valve is open and said flow passage of said gate member aligns with said valve chamber flow passages and a gate position in which the valve is closed and said imperforate section aligns with said valve chamber flow passages;

(c) a valve seat in each of the recesses around the end of said flow passages facing said valve chamber, each of said valve seats comprising a ring-shaped seat against which said gate member slides between the open and closed positions such that said gate member forms a first seal with said ring-shaped seat in said upstream flow passage and first means for mechanically actuating said primary seal between said seat in said upstream flow passage and Said gate member and for maintaining said first seal between said seat in said upstream flow passage and said gate member by upstream pressure;

(d) a member slidably disposed around the circumference of said ring-shaped seat in said upstream flow passage, said member having a recess therearound at the end adjacent said gate member;

(e) a seal member disposed in said recess of said member to form a second seal with said gate member adjacent to said gate member flow passage when the upstream fluid pressure provides sealing engagement force on said seal member against said gate member; and (f) second means for mechanically causing contact between said seal member and said gate member.

3. The valve of claim 1, wherein said second means includes:

(g) a yoke;

(h) a camming edge disposed along opposite sides of said gate member;

(i) pin follower means carried by said yoke and adapted to engage with said camming edges.

4. A gate valve having an upstream side and a downstream side subject to upstream fluid pressure from fluid passing through the valve from upstream to downstream, comprising:

(a) a valve body having a valve chamber therein and a pair of flow passages aligned at opposite sides of said valve chamber, and additionally having a recess around the end of each of said aligned flow passages facing said valve chamber, one of said flow passages being an upstream passage on the upstream side and the other of said flow passages being a downstream passage on the downstream side;

(b) a gate member having an imperforate section and a section having a flow passage therethrough, said gate member being disposed within said valve chamber and being reciprocally movable along a line substantially transverse to said valve chamber flow passages, between a gate position in which the valve is open and said flow passage of said gate member aligns with said valve chamber flow passages and a gate position in which the valve is closed and said imperforate section aligns with said valve chamber flow passages;

(c) a valve seat in each of said recesses around the end of the flow passages, each of said valve seats comprising a ring-shaped seat between which said gate member slides between the open and closed position, such that said gate member forms a first seal in response to upstream pressure with said ring-shaped seat in said upstream flow passage, including a primary seal means for forming the first seal between said gate member and said ring-shaped seat in said upstream flow passage, said ring shaped seat having an outside peripheral surface and two ends, one end adjacent to said gate member;

(d) a member slidably disposed around said ring-shaped seat in said upstream flow passage, said member having a recess therearound at the end adjacent said gate member;

(e) an elastomeric seal member disposed in said recess of said member to form a secondary seal with said gate member at the end adjacent said gate member; and (f) means associated with said member for a secondary seal for drawing said member for a secondary seal toward said gate member to force said elastomeric seal member into position for sealing engagement with said gate member.

5. The gate valve of claim 4 wherein said primary seal means includes a spring between said valve body and the end of said valve seat facing said valve body having sufficient compressibility to urge said valve seat against said gate.

6. The gate valve of claim 5, wherein said spring is a belleville spring.

7. A gate valve having an upstream side and a downstream side subject to upstream fluid pressure from fluid passing through the valve from upstream to downstream, comprising:
(a) a valve body having a valve chamber therein and an upstream and a downstream flow passage corresponding to the upstream and downstream sides aligned at opposite sides of the valve chamber, and additionally having a recess around the end of each of the aligned flow passages facing the valve chamber;
(b) a gate member having an imperforate section and a section having a flow passage therethrough, the gate member being disposed within the valve chamber and being reciprocally movable along a line substantially transverse to the valve chamber flow passages, between a gate position in which the valve is open and the flow passage of the gate member aligns with the valve chamber flow passages and a gate position in which the valve is closed and the imperforate section aligns with the valve chamber flow passages;
(c) a valve seat in each of the recesses around the end of the flow passages, each of the valve seats comprising a ring-shaped seat between which the gate member slides between the open and closed position and having a primary seal means for forming a first seal between the gate member and the ring-shaped seat in the upstream flow passage in response to upstream pressure, the ring shaped seat having an outside peripheral surface and two ends, one end adjacent to the gate member;
(d) a member slidably disposed around the outside of the upstream ring-shaped seat in the upstream flow passage, the member having a recess therearound at the end adjacent the gate member;
(e) an elastomeric seal member disposed in the inner recess of the member to form a secondary seal with the gate member; and
(f) second seal means responsive only to upstream fluid pressure for providing sealing engagement force of said elastomeric seal member against said gate member which force is commensurate with the upstream fluid pressure to form a second seal, and contact means for providing initial contact of the member against the gate member.

8. The valve of claim 7, in which said contact means is a belleville spring.

9. The valve of claim 7, in which the gate member forms a first seal with the upstream ring-shaped seat in the upstream flow passage and the member forms a secondary seal with the gate member.

10. The valve of claim 7, wherein the ring-shaped seat in the upstream flow passage includes a second elastomeric seal sealing between the member for a secondary seal and the upstream ring-shaped seat in the upstream flow passage.

11. The valve of claim 10, wherein the ring-shaped seat in the upstream flow passage includes a third elastomeric seal sealing between the valve body and the ring-shaped seat in the upstream flow passage.

12. The valve of claim 11, wherein the upstream ring-shaped seat in the upstream flow passage includes a fourth elastomeric seal forming the primary seal.

13. The valve of claim 7, wherein the first seal means includes a spring between the valve body and the end of the valve seat in the upstream flow passage facing the valve body having sufficient compressibility to urge the valve seat in the upstream flow passage against the gate member.

14. The valve of claim 7, wherein said second seal means includes:
(g) a second recess on the ring-shaped seat in the upstream flow passage;
(h) a second elastomeric seal member disposed in the second recess and responsive to upstream fluid pressure for providing force to the elastomeric seal member.

15. The gate valve of claim 14, wherein the second recess is located on the periphery of the ring-shaped seal in the upstream flow passage facing the member for the secondary seal.

16. The valve of claim 7, wherein said second seal means includes a second seal member sealing between the member for the secondary seal and the ring-shaped seat in the upstream flow passage.

17. A gate valve for use with fluid under pressure, comprising:
(a) a valve body having a valve chamber therewithin and a pair of flow passages through the valve body aligned at opposite sides of the valve chamber, the valve body further having a recess around the end of each of the aligned flow passages facing the valve chamber, one of the flow passages being an upstream flow passage for receiving the fluid under pressure and the other of the flow passages being a downstream flow passage for discharging the fluid under pressure;
(b) a ring-shaped seat member disposed in each recess around the end of the flow passages facing the valve chamber;
(c) a gate in the valve chamber having an imperforate section for preventing fluid flow in a closed position of the gate and a section with a flow passage therethrough for permitting fluid flow in an open position of the gate;
(d) seal means associated with the gate and the ring-shaped seat member in the upstream flow passage for forming a mechanical and fluid energized primary seal between the ring-shaped seat member in the upstream flow passage and the gate;
(e) a secondary seal member disposed around the ring-shaped seat member in the upstream flow passage having means to reciprocate on the ring-shaped seat member in the upstream flow passage, the secondary seal member comprising
a first means for mechanically forcing the secondary seal member into engagement with the face of the gate,
a second means responsive to fluid pressure in the upstream flow passage for providing sealing engagement force on the secondary seal member against the face of the gate.

18. A gate valve having an upstream side and a downstream side subject to upstream fluid pressure from fluid passing through the valve from upstream to downstream, comprising:
(a) a valve body having a valve chamber therein and a pair of flow passages, an upstream flow passage on the upstream side and a downstream flow passage on the downstream side, aligned at opposite sides of the valve chamber, and additionally having a recess around the inner end of each of the aligned flow passages;
(b) a gate member having an imperforate section and a section having a flow passage therethrough, the gate member being disposed within the valve chamber and being movable between a position in which the valve is open and the flow passages of the gate member aligns with the valve chamber flow passages and a position in which the valve is closed and the imperforate section aligns with the valve chamber flow passages;

(c) a valve seat in each of the recesses around the inner end of the valve chamber flow passages, each of the valve seats comprising a ring-shaped seat between which the gate member moves between the open and closed positions such that the gate member forms a primary seal with the upstream ring-shaped seat and first means for mechanically actuating the primary seal between the upstream seat and the gate member and for maintaining the primary seal between the upstream seat and the gate member in response to upstream line pressure, the ring shaped seat having an outside peripheral surface and two ends, one end adjacent to the gate member;

(d) a secondary seal means responsive only to differential fluid pressure caused by the upstream fluid pressure to form a second seal after the primary seal is formed by upstream line pressure comprising a secondary seal member slidably disposed around the outside of the upstream ring-shaped seat, the secondary seal member having an inner recess therearound at the end adjacent the gate member, whereby the second seal acts to maintain a sealing engagement with the gate member only if the primary seal leaks;

(e) a seal member disposed in the inner recess of the secondary seal member; and (f) second means for mechanically actuating the second seal member against the gate member and for maintaining the secondary seal member against the gate member by differential pressure caused by the upstream fluid pressure if the primary seal leaks after mechanical actuation.

19. The gate valve of claim 18, wherein said second means includes means for line pressure seal maintenance by forcing the surface of the secondary seal member against the gate member by differential pressure.

20. The gate valve of claim 18, wherein said upstream ring-shaped seat has a first surface and a second surface, and there is further included primary seal spring means normally biasing said upstream ring-shaped seat toward said gate member such that when said gate member is in said closed position an initial primary seal is provided by said upstream ring-shaped seat against said gate member at said first surface; said first surface and second surface each having an area being exposed to the pressure of fluid in said upstream flow passage, said second surface area exposed to such fluid pressure being greater than said area of said first surface exposed to such fluid pressure, whereby the fluid pressure in said upstream flow passage forces the upstream ring-shaped seat against said gate member and establishes a primary seal preventing flow along the surface of said gate member when it is in said closed position.

21. The gate valve of claim 20, wherein said secondary seal member has a first surface and a second surface, and there is included a secondary seal spring means normally biasing said secondary seal member toward said gate member such that when said gate member is in said closed position an initial secondary seal is provided by said secondary seal member against said gate member at said first surface of said secondary seal member; said first surface and said second surface of said secondary seal member surfaces each having an area being exposed to fluid pressure resulting from pressure of fluid in said upstream flow passage when said primary seal leaks fluid along the surface of said gate member, said second surface area of said secondary seal member exposed to such fluid pressure being greater than said area of said first surface of said secondary seal member exposed to such fluid pressure, whereby the fluid pressure from said upstream flow passage forces said secondary seal member against said gate member and maintains said secondary seal member against said gate member by line pressure preventing flow along the surface of said gate member when said gate member is in the closed position and said primary seal leaks.

22. The gate valve of claim 21, wherein the upstream ring-shaped seat has a groove in the first surface adjacent said gate member and includes a resilient ring seal disposed in said groove normally bearing against said gate member in said closed position to form the initial primary seal.

23. The gate valve of claim 18, wherein the second means for mechanically actuating the secondary seal member against the gate member includes cooperating cam means associated with said gate member and said upstream ring-shaped seat for moving the secondary seal member against the gate member.

24. The gate valve of claim 23, wherein said upstream ring-shaped seat has a first surface and a second surface, and there is further included primary seal spring means normally biasing said upstream ring-shaped seat toward said gate member such that when said gate member is in said closed position an initial primary seal is provided by said upstream ring-shaped seat against said gate member at said first surface; said first surface and said second surface each having an area being exposed to the pressure of fluid in said upstream flow passage, said second surface area exposed to such fluid pressure being greater than said area of said first surface exposed to such fluid pressure, whereby the fluid pressure in said upstream flow passage forces the upstream ring-shaped seat against said gate member and establishes a primary seal preventing flow along the surface of said gate member when it is in said closed position.

25. The gate valve of claim 24, wherein said secondary seal member closely surrounds said upstream ring-shaped seat, said secondary seal member having a first surface and a second surface, such that when said gate member is in said closed position an initial secondary seal is provided by said secondary seal member against said gate member at said first surface of said secondary seal member; said first surface and said second surface of said secondary seal member surfaces each having an area being exposed to fluid pressure resulting from pressure of fluid in said upstream flow passage when said primary seal leaks fluid along the surface of said gate member, said second surface area of said secondary seal member exposed to such fluid pressure being greater than said area of said first surface of said secondary seal member exposed to such fluid pressure, whereby the fluid pressure from said upstream flow passage forces said secondary seal member against said gate member and maintains said secondary seal member against said gate member by line pressure preventing flow along the surface of said gate member when said gate member is in the closed position and said primary seal leaks.

26. The valve of claim 25, wherein the upstream ring-shaped seat has a groove in the first surface adjacent said gate member and includes a resilient ring seal disposed in said groove normally bearing against said gate member in said closed position to form the primary seal.

27. A gate valve having an upstream side and downstream side subject to upstream fluid pressure from fluid under pressure passing through the valve, the fluid under pressure originating from an upstream flow line connected to the valve, comprising:

(a) a valve body having a valve chamber therein and a pair of flow passages aligned at opposite sides of the valve chamber, and additionally having a recess around the inner end of each of the aligned flow passages;

(b) a gate member having an imperforate section and a section having a flow passage therethrough, the gate member being disposed within the valve chamber and being reciprocally movable along a line substantially transverse to the valve chamber flow passages, between a gate position in which the valve is open and the flow passage of the gate member aligns with the valve chamber flow passages and a gate position in which the valve is closed and the imperforate section aligns with the valve chamber flow passages;

(c) a valve seat in each of the recesses around the inner end of the flow passages, each of the valve seats comprising a ring shaped seat between which the gate member slides between the open and closed position such that the gate forms a primary seal with only the upstream ring shaped seat when the gate is in the valve closed position, the ring-shaped seat having an outside peripheral surface and two ends, one end adjacent the gate;

(d) a seal support ring slidably disposed around the outside of the upstream ring shaped seat, the seal support ring having an inner recess therearound at the end adjacent the gate;

(e) an elastomeric seal member disposed in the inner recess of the seal support ring;

(f) means for providing initial contact of the elastomeric seal member against the gate;

(g) responsive means responsive to fluid pressure for providing sealing engagement force of said elastomeric seal member against said gate to form an upstream secondary seal, whereby the secondary seal is pressure enhanced on the upstream side of the gate;

(h) after the primary upstream seal is formed, the responsive means acts to form the secondary upstream seal, whereby the primary upstream seal acts to protect the secondary upstream seal from wear; and (i) the responsive means includes means to provide engagement force commensurate with the fluid pressure, whereby the secondary upstream seal acts to maintain a sealing engagement with the gate only if the primary seal leaks.

* * * * *